May 17, 1932. J. PLEBANSKI 1,858,936
PROCESS AND APPARATUS FOR UNDISTURBED RADIOCOMMUNICATION
Filed Dec. 29, 1927 5 Sheets-Sheet 1

May 17, 1932.   J. PLEBANSKI   1,858,936
PROCESS AND APPARATUS FOR UNDISTURBED RADIOCOMMUNICATION
Filed Dec. 29, 1927   5 Sheets-Sheet 2

J. Plebanski
INVENTOR

May 17, 1932.  J. PLEBANSKI  1,858,936
PROCESS AND APPARATUS FOR UNDISTURBED RADIOCOMMUNICATION
Filed Dec. 29, 1927  5 Sheets-Sheet 3

J. Plebanski,
INVENTOR

May 17, 1932. J. PLEBANSKI 1,858,936
PROCESS AND APPARATUS FOR UNDISTURBED RADIOCOMMUNICATION
Filed Dec. 29, 1927 5 Sheets-Sheet 4

J. Plebanski
INVENTOR
By Marks & Clerk
Attys.

May 17, 1932.  J. PLEBANSKI  1,858,936
PROCESS AND APPARATUS FOR UNDISTURBED RADIOCOMMUNICATION
Filed Dec. 29, 1927    5 Sheets-Sheet 5

J. Plebanski
INVENTOR

By: Marks & Clerk
ATTYS.

Patented May 17, 1932

1,858,936

UNITED STATES PATENT OFFICE

JÓZEF PLEBAŃSKI, OF WARSAW, POLAND

PROCESS AND APPARATUS FOR UNDISTURBED RADIOCOMMUNICATION

Application filed December 29, 1927, Serial No. 243,434, and in Poland January 7, 1927.

For a long time many efforts have been made in radio-telegraphy and radio-telephony to devise arrangements for the elimination of atmospherics and other interferences of a casual character.

All these attempts, however, have been unsuccessful, so far as the applicant is aware because the receiving arrangements hitherto used, consist in each case of certain tuned circuits resonating on the one hand to the received signal and on the other hand excited by shock, as for instance by atmospherics, oscillated for a short time at their natural frequencies, this time depending upon the damping of respective circuits. In this manner these free oscillations have passed the detector and produced noises in the headphones or loudspeaker. The construction of a circuit resonating to the signal but not oscillating under atmospheric shock excitation is impossible. The utilization of high-frequency filters does in fact to a certain extent reduce the atmospherics, but for the above reasons an entire elimination is not obtained.

The present invention permits the possibility of eliminating atmospherics utilizing a novel method of transmission and reception, namely by using more than one phase of audible or supersonic modulating frequency using hereby one carrier wave, and by using in receiver more than one detector (detector valves) and utilizing rotary magnetic or electric fields produced by the said detectors respectively using the difference of detector currents.

The invention is illustrated by way of example in the accompanying drawings, in which.

In the case of the ordinary telegraphically or telephonically modulated wave:

(1) $e = A \sin \omega t + B \sin pt \sin \omega t =$ $$A \sin \omega t + \frac{B}{2} \cos (\omega - p) t - \frac{B}{2} \cos (\omega + p) t.$$

here $\omega = 2\pi\nu$ angular frequency of the carrier wave, $p = 2\pi\gamma$ angular frequency of the modulating wave.

It is known that for detection the two side bands are not indispensable. From this it follows that we can have reception eliminating one side band, for instance in the above expression the term $$-\frac{B}{2} \cos (\omega + p)t.$$

There are many systems of this kind which work with good results. Consequently, by inverting one side band (giving to it a phase displacement of 180°) we can get the same effect of compensation for atmospherics by means of the two detectors as is stated above. We will go into this matter with all details: assuming that we have such a modulation of the transmitter that $$e = A \sin \omega t + \frac{B}{2} \cos (\omega - p)t + \frac{B}{2} \cos (\omega + p)t =$$

$$A \sin \omega t + B \cos \omega t \cos pt.$$

It can be shown that this one side-band inversion is equivalent to the addition to the ordinary modulated wave of some wave, unmodulated but phase-shifted at 45°, of the same frequency as the carrier wave, since $$e = A \cos \omega t + B \cos pt \cdot \cos \omega t -$$

$$\sqrt{2} \cdot A \cos \left(\omega t + \frac{\pi}{4}\right) =$$

$$A \sin \omega t + B \cos pt \cdot \cos \omega t.$$

If we pass through the detector the wave $$e = A \sin \omega t + B \cos \omega t \cdot \cos pt,$$

then we shall obtain:

$$i_d = a_2 \left[ \frac{A^2}{2}(1 - \cos 2\omega t) + \frac{B^2}{4}(1 + \cos 2\omega t)(1 + \cos 2pt) AB \sin 2\omega t \cos pt \right] +$$

high-frequency terms.

Figures 1, 2, 3, 4, 5, 6, 7, 8:
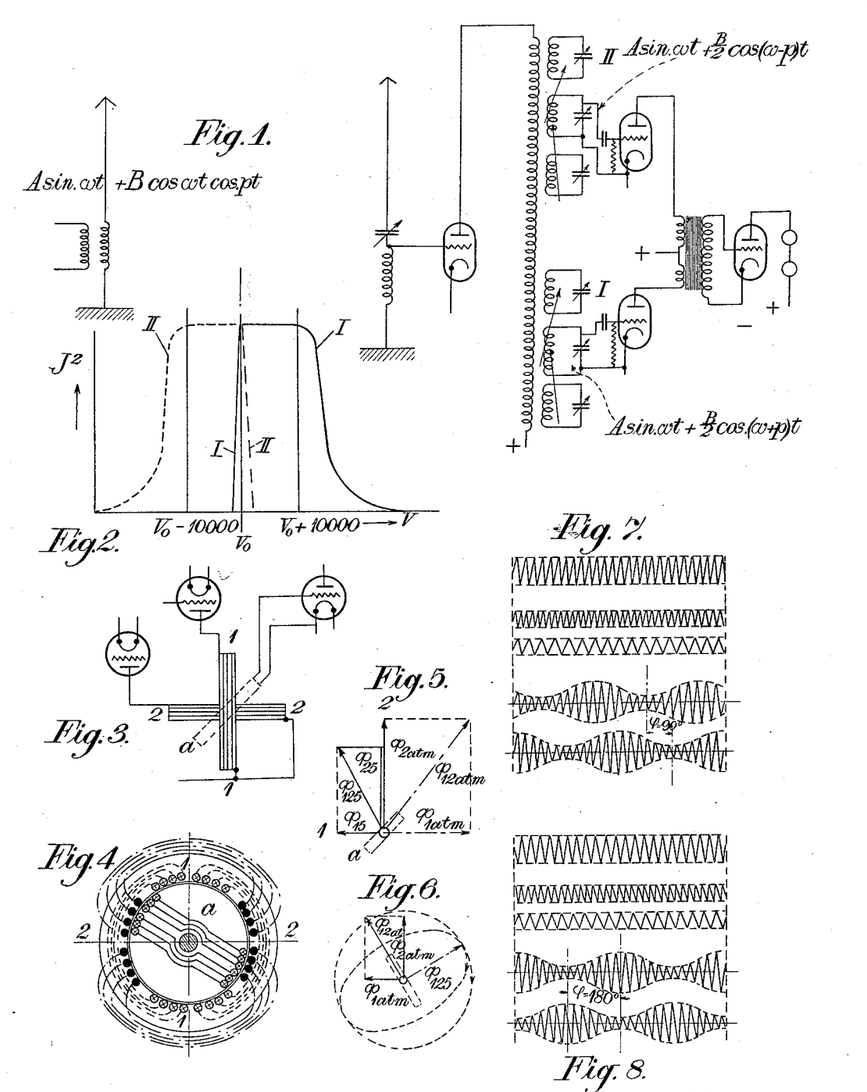
Figure 1 is a circuit diagram of an arrangement comprising high-frequency filters.
Figure 2 shows the characteristic curve of the filters shown in Figure 1.
Figure 3 is a circuit diagram of a goniometer device.
Figure 4 is a winding diagram of the goniometer device illustrated in Figure 3.
Figure 5 is a vector diagram illustrating the action of the goniometer device of Figures 3 and 4.
Figure 6 is a diagram illustrating reception by means of the goniometer device of Figures 3 and 4.
Figures 7 and 8 are wave diagrams illustrating the division of waves into so-called right and left side bands.

We see from the above that a proper detection will not be obtained; we shall only obtain a detection with simultaneous doubling of the audible frequencies. If, however, we apply high-frequency filters as shown for instance in Fig. 1, that is filters having the characteristic shown in Fig. 2, then the sidebands will be separated, and through the detector on one side will pass $$e_1 = A \sin \omega t + \frac{B}{2} \cos (\omega - p)t,$$

and on the other side (through the second detector)

$$e_2 = A \sin \omega t + \frac{B}{2} \cos (\omega + p)t.$$

We can easily calculate that the difference between the detector currents will be:

$$i_{d_1} - i_{d_2} = a_2 \left[ -\frac{B^2}{4} \sin 2 \omega t \sin 2pt - AB \sin pt + AB \cos 2\omega t \sin pt \right] + \text{high-frequency}$$

terms $= -a_2 \cdot AB \sin pt +$ high-frequency terms.

If we put in the expressions of $1_1$ and $1_2$ mentioned above the term $Ce^{-t} \sin t$, by squaring them and subtracting we shall get the proper solution for the differential detector current under signal and atmospheric excitation simultaneously. It can be shown then that the disturbance will be greatly diminished and practically eliminated.

It will be seen from the above that this kind of radio-communication eliminating atmospherics is quite possible.

It is evident from the above considerations that nothing will be altered if we apply two-fold, three-fold or $n-$fold modulation, that is to say, if we modulate at a frequency of 1000 cycles for example, in ordinary way, a frequency of 10,000 periods per second, and then modulate, with the resulting modulated wave, a frequency of 100,000 periods with some phase displacement as stated above; and then modulate, with the resulting modulated waves, a transmitter of a frequency of 1,000,000 cycles, with or without inversion of side band, or by applying some other waves, such for instance as 1,200,000 and so on. It is obvious that in this case a series of detections will be necessary in the receiver, for instance, firstly to 100,000 cycles, afterwards to 10,000 and finally to 1,000. Evidently application of the above means of atmospheric elimination is possible in one or more of these intermediate frequencies or in all the intermediate frequencies.

For the case in which only one carrier wave is employed in the transmitter, according to what is stated above, a differential transformer may for example be employed in the receiver. Instead of this, however, it is also possible to employ a goniometer device according to Figure 3, and the coils, wound somewhat according to Figure 4 may be air-cored or iron cored. Such a goniometer always enables a position of the movable coil $a$ to be found, in which any disturbances are eliminated and the transmissions are audible, on the basis of the reversal of one phase of the audio-frequency wave, as indicated in the diagram of Figure 5. The goniometer device may be employed even when the transmission is being effected with one wave in a different manner, namely by the carrier wave being so modulated that the final electromotive force $e$ is given by the expression (2) $\quad e = A \sin \omega t + B \sin pt \cdot \sin\left(\omega t + \dfrac{\pi}{4}\right)$ In a goniometer wound according to Figure 4, a rotating field is produced in this way, and from the diagram according to Figure 6 it will be recognized that the reception is possible with complete suppression of interference.

The so-called reversal, described before of one of the two side bands of the modulating wave in the transmitter, corresponds to a modulation in which the final electromotive force is defined by the expression.

(3) $\quad e = A \sin \omega t + B \cos pt \cdot \cos \omega t.$

This is equivalent to a modulation with two phases $\sin pt$ and $\sin (pt + 180°)$. The case described by Formula (1) corresponds to a modulation with a phase displacement of 90°.

It can easily be shown that if, to a wave of the expression (4) $\quad e = A \sin \omega t + B \sin pt \cdot \sin \omega t$ modulated in the usual manner is added a wave $A_1 \cdot \sin (\omega t + \psi)$, with a suitably selected amplitude $A_1$ and a suitable angle of phase displacement, detector waves are obtained in the final result corresponding to the Formulæ (2) and (3), or else such waves with other phase displacements.

The dividing of these waves into so-called right and left side bands can be seen in Figures 7 and 8. Fig. 7 corresponds to Formula (2) and Fig. 8 to Formula (3).

It is quite generally true that by the addition of a wave of any desired amplitude and of any desired phase to the normally modulated wave, any phase displacement of the modulating wave is obtained, and consequently, in the goniometer arrangement according to Figure 3, a rotating field is obtained. In the case of Formula (2) a circular rotating field is obtained as a special case of the elliptical rotating field generally produced. As a second limiting case an alternating field of definite direction is produced in the arrangement according to Formula (3). This can easily be proved as follows:—

To a wave $e_1 = A_1 \sin \omega t + B_1 \sin pt \cdot \sin \omega t$ modulated in the ordinary way add a non-modulated wave of the same frequency but with a phase displacement of $\phi_2$ and an amplitude of $A_2$ $e_2 = A_2 \sin (\omega t + \phi_2).$ As the sum of these an expression is obtained of the form $e_1 + e_2 = A_3 \sin (\omega t + \phi_3) + B_1 \sin pt \cdot \sin \omega t$ $\qquad = A_3 \sin (\omega t + \phi_3) + \dfrac{B}{2} \cos (\omega - p)t$ $\qquad - \dfrac{B}{2} \cos (\omega + p)t.$ The detectors or systems of detectors arranged in accordance with the above stated effect a division of the side bands. The first detector circuit may allow the partial wave $X = A_3 \sin (\omega t + \phi_3) + \dfrac{B_1}{2} \cos (\omega - p)t$ to pass through; while the second affords passage to the wave $Y = A_3 \sin (\omega t + \phi_3) - \dfrac{B_1}{2} \cos (\omega + p)t.$ If these expressions are inserted in the general equation for the detector current, this gives, for the current in the first detector circuit.

$i_{d_1} = \dfrac{A_3 \cdot B_1}{2} \cos (pt - \phi_3) + \text{high-frequency terms}$ and for the current in the second detector circuit $i_{d_2} = \dfrac{A_3 \cdot B_1}{2} \cos (pt + \phi_3) + \text{high frequency terms}$ The comparison of these two formulæ shows that the phase difference between the two rectified side bands is equal to $2\phi_3$.

$\phi_3 = 90°$ yields an alternating field of definite direction.

$\phi_3 = 45°$ yields a circular rotating field.

$\phi_3$ greater than 45° but less than 90° yields an elliptical rotating field.

$\phi_3$ greater than 0° but less than 45° yields an elliptical rotating field.

The modulation of a wave with side bands out of phase may be effected in two ways. There may be added to the modulated wave a wave of the frequency of the carrier wave and of any desired amplitude and arbitrary phase, or else there may be added to the modulated wave phase-shifted, modulated waves. The processes resulting from this will be understood by reference to Figures 9 to 11.

Figures 9, 10:
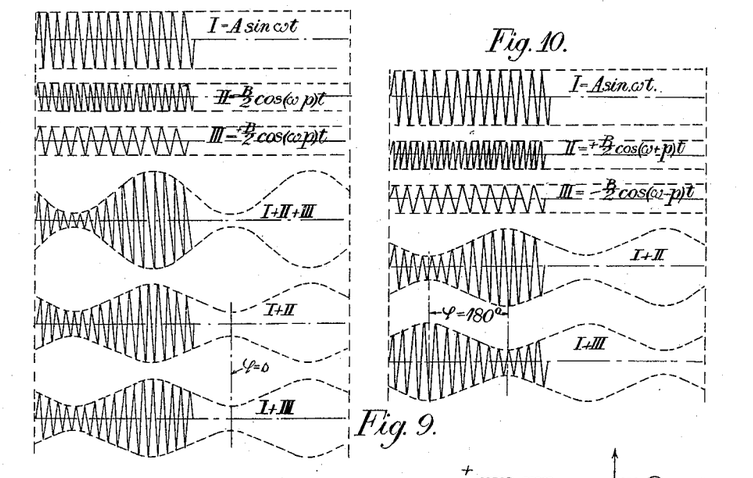
Figure 9 is a diagram of a wave modulated in the usual manner.
Figure 10 represents the same wave with one side band reversed.

Figure 9 is a diagram of a wave modulated in the usual manner. The two side bands are co-phasal, and consequently, after passing through two detectors or systems of detectors connected in opposition to one another, they are not heard.

Figure 10 relates to the same modulated wave, wherein however, one side band has been reversed. The detector currents are consequently phase-shifted through 180° relatively to one another, and telephonic reception is possible.

Figures 11, 12, 13:
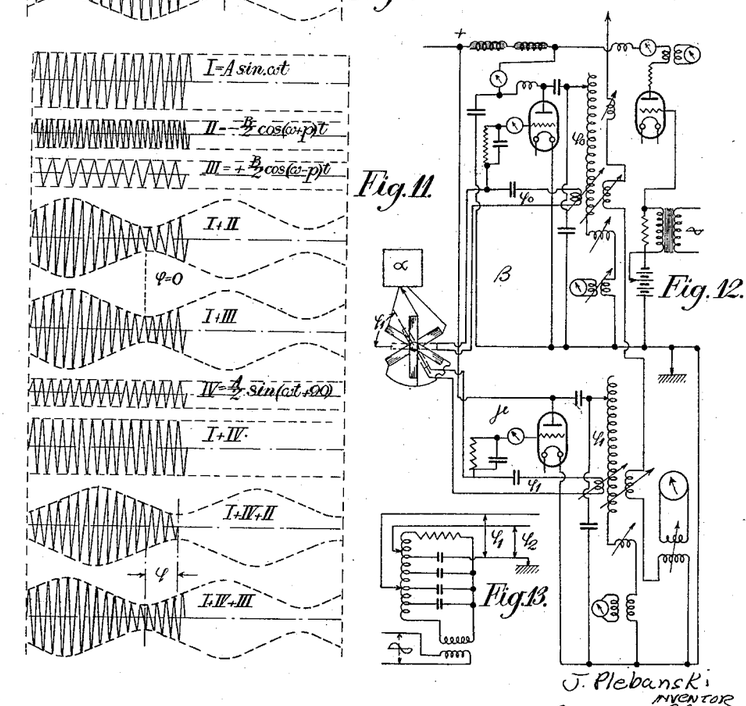
Figure 11 represents the wave phase-shifted by addition.
Figure 12 is a circuit diagram of a transmitter producing phase-shifted waves as illustrated in Figures 9 to 11.
Figure 13 is a circuit diagram of a so-called artificial line for phase-shifting purposes.

From Figure 11 it will be clearly seen that a phase displacement of the detector currents is also obtained by adding to a wave modulated in the usual way a wave of the frequency of the carrier wave but out of phase therewith.

From the drawings it can be immediately gathered in what manner a phase displacement of the detector currents occurs if two modulated waves are added instead of one.

The above considerations show that the device according to the invention in the transmitter is exceedingly simple. The diagram of the connections of the parts of such a transmitter that are essential to the invention is given in Figure 12.

It relates to the employment of an independent three-phase oscillation-generator as an example of the polyphase oscillation-generator generally employed. One phase of this three-phase oscillation-generator $\alpha$ is utilized for the excitation of the main oscillator $\beta$ the amplitude of which is modified. A second phase is utilized for the excitation of the second main oscillator $\gamma$. In this manner there is obtained in the aerial the modulated wave from the transmitter $\beta$ and the second wave, originating from the transmitter $\gamma$ of the same frequency, but phase-shifted and not modulated. The simplicity of the construction is immediately obvious. On the basis of the theoretical considerations it will be recognized that the phase displacement must amount to about 45° and in any case must be less than 90°. On this ground, instead of the polyphase oscillation-generator, a single-phase oscillating circuit may be employed as exciter, and the phase shifting effected in another way, with the assistance for example of a so-called artificial line or other phase-shifting arrangement, as shown in Figure 13. With equal success, simple parallel oscillating circuits may be employed with different values of the inductances, the resistances and the capacities.

For the separation of the side bands in the receiver, the filter circuits described before may be employed. The characteristics of such high-frequency filters enable the side bands to be completely separated. Theory and experiments have shown that two simultaneously excited oscillating circuits coupled together yield characteristics which are exceedingly similar to those of the filter circuits mentioned. Two oscillating circuits not coupled together, and slightly detuned, to the extent of about 6000 oscillations per second, may be employed in the same manner for the separation of the side bands.

Figure 14:
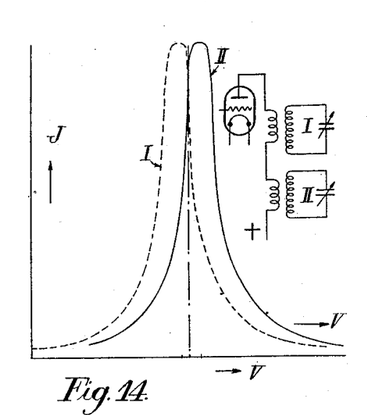
Figure 14 represents two oscillating circuits, slightly de-tuned; the resonance curves obtained therefrom.

Figure 14 shows resonance curves for two such oscillating circuits, each of which has an effective resistance of about 12 ohms at a natural frequency of about 1,000,000, corresponding to a wave 300 metres long. The detuning of 6000 oscillations per second is able to ensure a sufficient separation of the side bands, as is obvious from the figure.

The same oscillating circuits still yield a marked separation of the side bands if they are coupled to one another.

Figure 15:
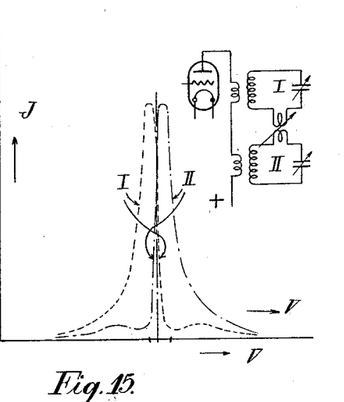
Figure 15 represents two oscillating circuits coupled together; and resonance curves obtained therefrom.

Figure 15, which refers to this case, shows that under the conditions set forth, one oscillating circuit has a minimum for longer waves, located immediately before the maximum, whereas the second oscillating circuit has a minimum for shorter waves, located immediately beyond the maximum. It will be immediately recognized that the separation of the side bands can in practice be effected in any case by simple means.

To the advantage conditioned by the simplicity of the connections and of the means required for a regular operation is added as a further advantage, the circumstance that the machines intended for feeding the oscillating circuits in the transmitter, work remarkably economically because they are not subjected to anything like such overloads as they have had to put up with in the case of the processes hitherto known, and because moreover, as contrasted with the working conditions hitherto occurring, they are never unloaded. Consequently the process according to the present invention needs lighter and cheaper machine sets than the processes hitherto known, and the variations in frequency brought about by considerable variations in load are not nearly so marked as with the ordinary transmission processes.

With a so-called 100% modulation, the energy in the radiating aerial varies, as is known, between zero and four times the amount of energy associated with the unmodulated carrier wave. Therefore all the machines delivering oscillatory energy must be of very much greater dimensions, on grounds of economy in operating the transmitter, than if they had to deliver continuously the mean power output. The considerable variations in energy also render necessary the employment of expensive auxiliary devices for stabilizing the frequency of the carrier wave. Accordingly the process according to the invention presents valuable advantages, which are immediately recognizable from the consideration of Figures 16 and 17.

Figure 16:
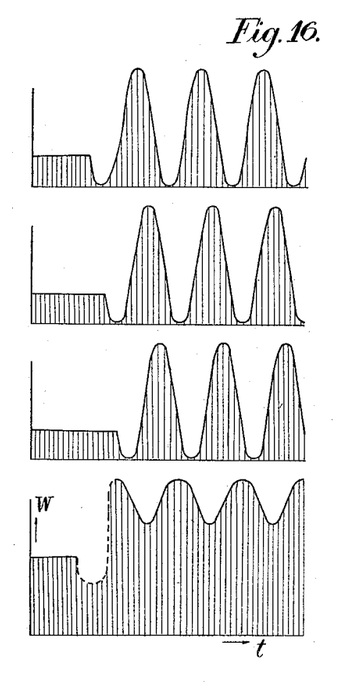
Figure 16 is a wave diagram representing three waves supplied from the same source with 100 per cent. modulation.

Figure 16 relates to the case in which three waves supplied from the same source of power undergo a 100% modulation. For the alterations in loading the sum of the partial currents is the determining factor. The aerial energy amounts under these conditions to twice the non-modulated aerial energy. The total energy varies between 120% and 180% of the non-modulated energy.

Figure 17:
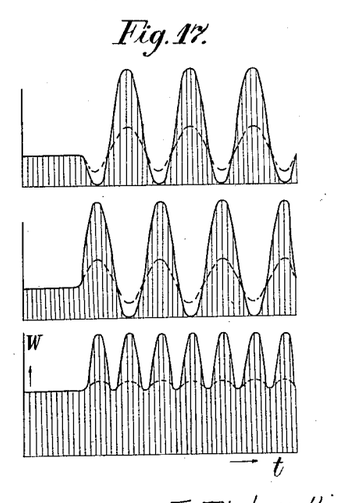
Figure 17 is a wave diagram representing two waves supplied from the same source with 100 per cent. modulation.

Figure 17 relates to the above conditions in the case of two waves. Here again there is an increase of 100% in the aerial energy, and the total energy varies between 100% and 200% of the non-modulated energy. The dotted lines refer to a 41% modulation, which in practice involves very small variations in the aerial energy, while producing in the detector of the receiver an effect of the same magnitude as in the case of the transmission systems hitherto usual. A similar remark applies to the phase-shifted modulation of one wave, that is, to the reversal of one of its side bands.

From the theoretical considerations it can be further inferred that when employing the process according to the invention, all transmitters operated in the customary way are not audible in the receiver. It is therefore possible to transmit and receive simultaneously with one and the same wave, if in one in one instance the process according to the present invention is employed, and in the other instance an ordinary process. Furthermore it can easily be proved that an ordinary heterodyne oscillating circuit, in conjunction with the process according to the invention, does not act because the beats in the heterodyned wave and the carrier wave are inaudible owing to identity of phase. One the other hand beats of the heterodyned wave with the modulated side bands are heard. If for example the heterodyned wave yields with the carrier wave 1000 beats per second, and a wave modulated with a frequency of 200 is received, what is heard in the receiver when using the process according to the invention is first a frequency of 200, second a frequency of $1,000-200=800$, and third a frequency of $1,000+200=1200$. The 1000 beats per second are not heard. Now the three audible frequencies can always be so selected that the notes corresponding to them form a chord agreeable to the ear.

It follows from the above that the beats of atmospheric interfering waves with the carrier wave are not audible.

All the foregoing considerations apply also to the transmission of radio-telegraphic messages. The transmitting key may be arranged anywhere in the grid circuit of a modulating valve connected in the customary manner, or transmission may be effected with tonic wave trains. In both cases an ordinary heterodyne circuit may be employed in the receiver, or a heterodyne circuit working with periodically increasing amplitude, which yields audible frequencies.

The addition, necessary for the production of the phase displacement, of a wave of equal frequency to the modulated wave, may be effected not only in the transmitter but also in the receiver. A special heterodyne oscillatory circuit is employed under such conditions that its oscillations can be made exactly equal in frequency to those of the modulated wave, and the amplitude of its oscillations is added to the modulated wave to be received. If in a receiver for carrying out the process according to the invention a heterodyne oscillatory circuit is employed, and the amplitude of the electromotive force induced by it in the receiving circuit is adjustable, it will easily be recognized by reference to the theoretical considerations that the transmissions can be received from stations operated in the manner hitherto usual, with the atmospheric interferences completely suppressed.

The carrying out of the process according to the invention is not bound up with the employment of special detectors, for detectors of any desired construction may be utilized, and also detector valves in any of the known circuit connections.

The detectors or valves employed need not be alike because the goniometers or differential transformers with adjustable anode supply circuits co-operating with them, enable the differences in the detectors or valves to be compensated for.

The process according to the invention and the devices serving for carrying it out, admit of being employed with comparatively trifling alterations, for sending a plurality of telegrams and telephonic or radio-telephonic signals with one and the same wave length, without affecting one another, and for the purpose of economically transmitting energy by wireless means. This will be recognized by reference to the following considerations.

The modulated carrier may have the form:—

$$e = A_1 \cdot \sin \omega_1 t + B_1 \cdot \sin pt \cdot \sin \omega_1 t + A_2 \cdot \sin (\omega_2 t + \phi_2) + \ldots + A_n \cdot \sin (\omega_n t + \phi_n) + \ldots$$
$$+ Ak_1 \cdot \sin (\omega_2 t + \phi k_1) + Bk_1 \cdot \sin (p_1 t + \phi p_1) \sin (\omega_2 t + \phi k_1) + \ldots$$
$$+ Ak_2 \cdot \sin (\omega_3 t + \phi k_2) + Bk_2 \cdot \sin (p_2 t + \phi p_2) \sin (\omega_3 t + \phi k_2) + \ldots$$
$$+ \ldots$$
$$+ Ak_{m-1} \cdot \sin (\omega_m t + \phi k_{m-1}) + Bk_{m-1} \cdot \sin (p_{m-1} t + \phi p_{m-1}) \sin (\omega_m t + \phi k_{m-1}).$$

In this expression all the co-efficients or constants may have values from zero to infinity, including these two limiting values, and they need not all be different from one another. The formula therefore constitutes the general expression for the wave modulated by the process according to the present invention. With special limiting conditions as regards the choice of the coefficients, the expression thus obtained represents the waves modulated by processes hitherto known.

Figure 18:
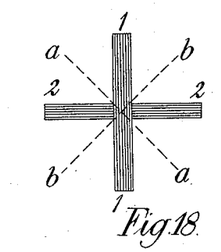
Figure 18 is a circuit diagram of a goniometer device for separating two simultaneous transmissions.

If one transmission for example corresponds to the expression.

$$e_1 = A_1 \cdot \sin \omega_1 t + B_1 \cdot \sin pt \cdot \sin \omega_1 t$$

and a second to the form $$e = A_2 \cdot \sin \omega_1 t + B_2 \cdot \cos pt \cdot \cos \omega_1 t$$

and in the receiver a goniometer is used with two stationary coils or groups of coils fixed at right angles to one another, the first transmission is perceptible if the movable goniometer coil in the circuit of the transformer connected to the detectors or the anode circuits of the detector valves has the position characterized in Figure 18 by the line $a$—$a$. To the audibility of the other transmission there corresponds the line $b$—$b$. The two transmissions do not affect one another.

Figure 19:
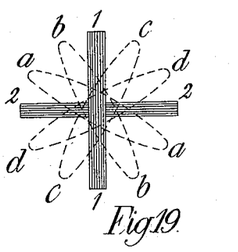
Figure 19 is a circuit diagram of a goniometer device for separating four simultaneous transmissions.

In the generally applicable formula hereinbefore mentioned the coefficients may also be so selected that the rotating fields produced in the differential transformer or in the goniometer by four simultaneous transmissions with waves of the same frequency have the position shown diagrammatically in Figure 19.

It is then possible to receive simultaneously all four transmissions effected by using the same wave length. The same thing applies quite generally for $n$ simultaneous transmissions with waves of the same frequency. It is self-evident that in such a case the $n$ transmissions are added in the transmitter in a suitable form and must be radiated by one or more aerials and that in the receiver there must be either a goniometer with $n$ movable coils or a plurality not necessarily equal to $n$, of goniometers may be used, which may for example be connected in series parallel. Then according to the distribution in these goniometers each of the $n$ transmissions may pass for reproduction into a suitable device, with the interposition of an amplifier if desired.

The goniometer coil movable in the space traversed by the rotating field may be constructed according to the invention as a short-circuited rotor, and may be eccentrically connected with the vibrating diaphragm of a sound-producer. In this manner a very satisfactorily acting telephone or loud speaker is obtained.

Amplifiers may obviously be connected in series with the goniometer. It is, however, not necessary to include amplifiers in all the $n$ leads at once.

The processes according to the invention are distinguished by remarkably great selectivity. This will be recognized by reference to the following considerations.

The selectivity of known devices operated according to the usual processes will first be set forth. For the direct illustration of the selectivity, resonance curves will be used, which show how the current depends upon its frequency.

Figure 20:
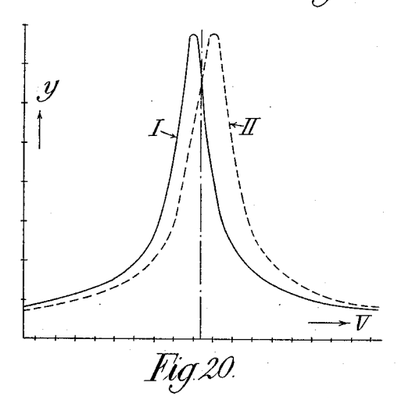
Figures 20 to 23 show resonance curves of two slightly de-tuned oscillating circuits.

Figure 20 shows the resonance curves of two slightly detuned oscillating circuits which act upon detectors. The rectified current produced in a differentially connected device, a differential transformer for example, by the interfering waves modulated in the customary manner is represented as the difference between the two resonance curves. It is shown in dotted lines in Figure 21. From this figure it is clearly seen that the disturbance exhibits a minimum value for exactly that wave to which, in the process according to the invention, the detuning is effected, and furthermore that maximum values of the interference occur with wave lengths which are closely adjacent to the wave length for resonance. For other wave lengths when employing devices for carrying out the processes according to the invention, the interference is very much less than when using the processes and devices hitherto usual, equal electromagnetic constants of the two oscillating circuits being assumed.

Figure 21:
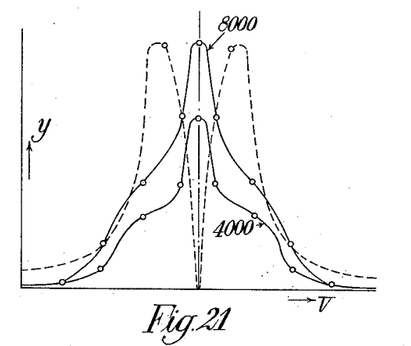

The obtaining of a resonance curve for a phase-shifted single-wave modulation is already rather difficult on account of the fact that it is dependent upon the modulation frequency. In Figure 21 such resonance curves are shown by full lines for the case of a phase displacement of 180°, corresponding to the so-called reversal of one side band according to the formula:—

$$e = A \cdot \sin \omega t + B \cdot \cos pt \cdot \cos \omega t,$$

firstly for a modulation frequency of 4000 and secondly for a modulation frequency of 8000, on the assumption that for example a differential transformer with detector circuits in the receiver is employed. These resonance curves were obtained on the assumption that with incomplete separation of the side bands the induced electromotive force in the first circuit can be expressed by the expression.

$$e = \left\{ A'_1 \cdot \sin \omega t + \frac{B'_1}{2} \cdot \cos (\omega - p)t \right\} + \{ A'_2 \sin \omega t + B_2 \cos pt \cdot \cos \omega t \} = X^1 + Y^1,$$

and the induced electromotive force in the second circuit by the expression.

$$e = \left\{ A''_1 \cdot \sin \omega t + \frac{B''_1}{2} \cdot \cos (\omega + p)t \right\} + \{ A''_2 \cdot \sin \omega t + B''_2 \cdot \cos pt \cdot \cos \omega t \} = X'' + Y''.$$

The following expression is then obtained for the difference between the detector currents.

$$i_{d_1} - i_{d_2} = a'_2 \cdot e'^2 - a''_2 \cdot e''^2 = a'_2 \{ X'^2 + Y'^2 + 2 \cdot X' \cdot Y' \} - a''_2 \cdot \{ X''^2 + Y''^2 + 2 \cdot X''Y'' \} = a'_2 \cdot X'^2 - a''_2 \cdot X''^2 + a'_2 Y'^2 - a''_2 \cdot Y''^2 + 2 \cdot a'_2 X' \cdot Y' - 2 \cdot a''_2 X'' Y''.$$

Figure 22:
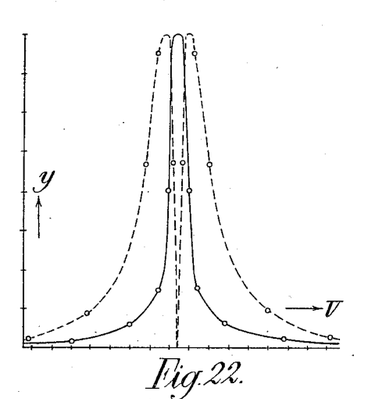
Figure 23:
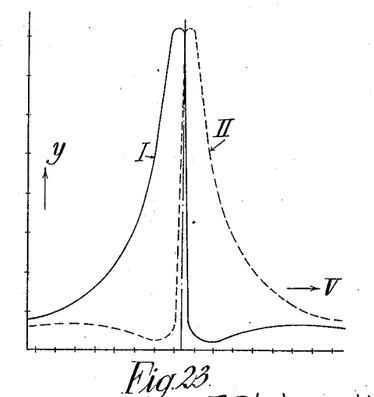

It can easily be shown that only the first two terms of this expression contain audio-frequency and that the remaining terms are either high-frequency terms or else exhibit components with upper octaves of the audio-frequency. That implies that for the present case of obtaining resonance curves only those first two terms need be taken into consideration. In this way the resonance curves of Figures 21 and 22 have been obtained. From these figures it can be clearly seen that the devices according to the invention, when using the same constants of the resonance circuits determining the selectivity, yield a selectivity which is considerably increased as compared with values hitherto customary when using waves modulated in the ordinary way and waves which are modulated with phase-shifted frequencies. This selectivity, which is already great in itself, can be still further noticeably improved if filtering devices are employed, as illustrated in Figure 15. The resonance curves corresponding to the use of such filters are shown in Figure 22. (In Fig. 23 we have the same curve as in Fig. 15, the curves of Fig. 22 are derived from those of Fig. 23.)

Furthermore the selectivity can of course still be increased by ordinary means, for example by a high-frequency amplifier with compensating capacities, heterodyne and so forth. In any case the Figures 21 and 22 show that the selectivity towards modulated waves phase-shifted about 180°, on the assumption of similar modulation of the received wave and of the interfering wave, is very great. It may be quite generally observed that the differentially connected detector system, as compared with the signal modulated in the way hitherto customary, or as compared with the phase-shifted modulated signals, is considerably more selective than the usual transmission devices. Thus for example with the devices according to the invention, the currents generated by waves differing from the resonance frequency by the frequency of 50,000 or 100,000 are very much weaker than when using ordinary transmitting and receiving devices, although in the case of resonance or approximate resonance, the detector currents with the process according to the invention, are equal to those which can be obtained with the processes hitherto customary.

A consideration of the dotted curves in Figures 21 and 22 might lead to the erroneous assumption that atmospheric disturbances are not completely suppressed. It is however to be observed that those curves are merely adapted to illustrate the selectivity in relation to interfering waves of a single frequency. Now the electro-magnetic interfering waves originating from atmospheric influences have by no means a single frequency but always consist of an accumulation of individual waves of different frequencies and comprise in their totality a very wide frequency band. Now it can be shown that the beats of the interfering waves with the band of frequencies to the left of the frequency of the carrier wave to be received, are eliminated by the beats of the interfering waves with the band of frequencies to the right of the carrier wave to be received. This result can easily be inferred by starting from two interfering waves with a single frequency each and considering the case of the two frequencies being on different sides but at equal distances from the resonance frequency.

Figures 24, 25, 26, 27:
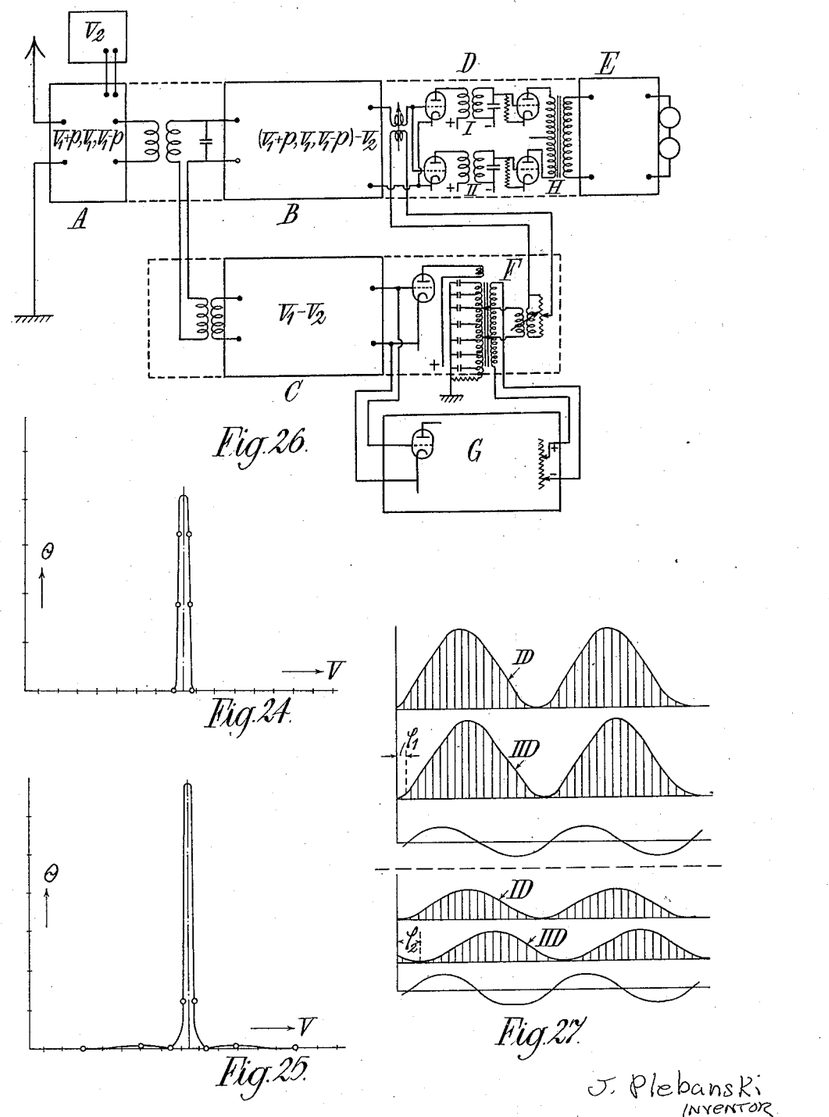
Figure 24 represents the relationship between frequency and effective turning moment in a receiver employing a rotating field.
Figure 25 represents the turning moment curve for two coupled circuits.
Figure 26 is a circuit diagram of a superheterodyne receiver.
Figure 27 is a wave diagram pertaining to Figure 26.

For the case of the production of an elliptical or circular rotating field, that is, for the case of a modulation with a phase displacement between 0° and 90° the resonance curves are of course different from those hitherto treated. This applies quite particularly when according to the invention the mechanical effect of the rotating field produced in two detector circuits is rendered usable in the receiver. Figure 24 illustrates the effective turning moment (torque) in its dependence upon the frequency, on the basis of a wave which is modulated by a wave with a frequency of 4000 with a phase displacement of 90° corresponding to the expression $$e = A \cdot \sin \omega t + B \cdot \sin pt \left(\omega t + \frac{\pi}{4}\right).$$

The remaining conditions correspond to those of Figure 20. Figure 25 shows the turning moment curve corresponding to Figure 23, that is, for two coupled circuits giving filtering effects as in Figure 15.

It will clearly be seen that outside a narrow band of frequencies the effective turning moment (torque) disappears. Hence there is here an exceedingly selective transmission device. It is further particularly noteworthy that all the devices than can be used for carrying out the process according to the invention do not respond in any way to any interfering waves whether their frequency is in the neighbourhood of the frequency of the carrier wave or far remote therefrom. The process according to the invention is consequently suitable for practical employment in a very special degree. Moreover the employment thereof is not limited to the utilization of mechanical effects in the goniometer rotating field but extends to a retransformation of the rotating field or of its components into a single-phase current.

If the phase shifting of the two side bands of the modulated wave is effected in the receiver, a special heterodyne oscillatory circuit is needed, the amplitude and frequency of which must be adjustable with extreme accuracy. The practical attainment of this indispensable fine regulation may present difficulties, which however can be eliminated if the following arrangement according to the invention is adopted.

To the telegraphically or telephonically modulated wave in the receiver are given two paths, one of which permits the passage of the carrier wave and of its two side bands, while the other permits the passage of the carrier wave only.

Figure 26 is a diagram of the connections of such a device, in a receiver working according to the super-heterodyne principle. Fundamentally, of course, the object can likewise be attained with simple resonance circuits, co-operating in the customary manner, but the employment of these means presents certain difficulties in the case of short waves.

The carrier wave that has been filtered out can be added to the modulated wave after suitable amplification and phase displacement according to the invention by an artificial line J, and the desired phase displacements can then be given to the two side bands in the two detector circuits D in the manner previously described. The data of the circuits D and E and also the constants of the artificial line J, may in this case be arbitrarily selected within wide limits on the grounds mentioned in connection with the theoretical considerations. A is any convenient heterodyne receiver, B is an intermediate-frequency amplifier of ordinary construction, dimensioned for instance for waves of a mean length of about 6,500 metres, for the reinforcing of the intermediate carrier wave with the two side bands, while the amplifier C amplifies only the wave of intermediate frequency, that is, the carrier wave or the intermediate carrier wave.

To compensate for the fading effect there serves according to the invention a special device G. It consists of a continuous-current bridge, which is supplied by any rectifier, and of which the continuous current to be obtained at the output terminals depends upon the high-frequency current supplied to the input terminals, so that its alteration is an unambiguous function of the high-frequency current strength. This continuous current is supplied to the iron-cord induction coil with cores F, of the artificial line J, and thus determines the field strength of the magnetic flux. The alterations in the continuous magnetizing current involve an alteration in the strength of the magnetic field in the space enclosed by the turns of the coils F, and therefore of the effective inductance. Consequently the phase of the high-frequency current acting upon the two detector circuits D also changes. The device can readily be so arranged that upon the occurrence of the fading effect, that is, upon a perceptible weakening of the signalling, the phase displacement of the two side bands becomes greater and the reception therefore stronger, as can be seen from Figure 27. In this manner the fading effect can be automatically compensated for, so that the wireless transmission is always perceptible with the same strength, quite independently of any alternations in the energy picked up by the receiver. This is of particularly great importance for the reception of radio-telephonic signals of short wave length.

With very short waves, slight alterations in the length of the radiated waves may obviously have the result that in the device described, particularly in the amplifier C, the intermediate carrier wave or the carrier wave itself may fall outside the effective range of the filtering members of C. In order to obviate this there may be provided in C a wave band filter which allows waves with a frequency difference of about 200 to pass. When working with multiple modulation, that is, when modulating more than once, wave-band filters for more widely extended ranges of filtering may be employed in C, and correspondingly also in B.

The arrangement "F" illustrated on Fig. 26 can be designed in another way:

Instead of using one phase of filtered out carrier frequency (or intermediate carrier wave frequency), we can use two phases (from corresponding tappings of the artificial line) which we can amplify by means of valves and then add geometrically and apply through a coil to the arrangement "D". In this way the phase acting upon the valves in arrangement "D" will be different from the two phases obtained from the arrangements F and J, because the resulting phase will be the geometrical sum of the two phases. If then the amplitude of one phase will be altered by means of the arrangement "G" for instance by altering the grid bias or anode voltage of the amplifying valve, then the phase acting upon arrangement "D" will be altered. We can get therefore the same effects as by using an artificial line with iron inductances.

In order to receive the continuous wave signal by the whole arrangement of Fig. 26 we can use either the arrangements previously described or we can modulate the continuous wave signal in arrangement "B", the arrangement "C" must pass only the non-modulated wave. The modulation of C. W. signal in "B" can be made by means of an acoustic or supersonic heterodyne acting upon grid or anode of some valve in "B" or in other known way. In this case during absence of signal in "E" we will not hear the local acoustic or supersonic heterodyne because the phase acting upon the two detector valves in "D" will be the same. As the C. W. signal appears the phases in "D" will be shifted relatively to each other and the signal will be heard.

Having now particularly described and ascertained the nature of my said invention and in what manner the same is to be performed, I declare that what I claim is:—

1. A method of radio-communication, comprising the phase-shifting of the two modulated side bands of one wave transmission, by addition, to the ordinary modulated wave represented by $$e = A \sin \omega t + B \sin pt \sin \omega t,$$

(where $\omega$ is $2\pi$ times the frequency of the carrier wave, and $p$ is $2\pi$ times the frequency of the modulating wave) of the non-modulated carrier wave phase-shifted through a definite phase angle, the resultant modulated wave having carrier and phase-shifted side bands, passing the phase-shifted side bands in the receiver through filters and detectors, and combining them together in a differential arrangement.

2. Means of radio-communication, comprising a transmitting station, a receiving station, means for transmitting a carrier wave and side bands shifted through a definite phase from the transmitting station, at least two detectors at the receiving station, each adapted to pass only one side band and the carrier wave, a goniometer device, consisting of at least two symmetrically distributed fixed coils, each of the said fixed coils being associated with one of the said detectors in such a way that relatively phase-shifted currents in the coils produce in the region enclosed by the coils a polarized rotating magnetic field, and of a coil rotatably mounted in the said magnetic field, and a receiver element adapted to receive current from the said rotatably mounted coil.

3. Means of radio-communication, comprising a transmitting station, a receiving station, means for transmitting a carrier wave and side bands shifted through a definite phase from the transmitting station, at least two detectors at the receiving station, each adapted to pass only one side band and the carrier wave, a goniometer device at the receiving station, consisting of a subdivided iron core, at least two symmetrically distributed fixed coils wound upon the said core, each of the said fixed coils being associated with one of the said detectors in such a way that relatively phase-shifted currents in the coils produce in the region enclosed by the coils a polarized rotating magnetic field, and of a coil rotatably mounted in the said magnetic field, and a thermionic valve having the said rotatably mounted coil connected in its grid circuit.

4. Transmitting apparatus for radio-communication comprising an aerial, an independent drive oscillator, a first main amplifying circuit coupled to the aerial, means for modulating the amplitude of the current in the said first main amplifying circuit, and a second main amplifying circuit, likewise coupled to the aerial, transmitting a non-modulated carrier wave, phase-shifted with respect to the carrier in the first amplifying circuit, so that the transmitting apparatus emits a carrier wave and phase-shifted bands.

5. A method of radio-communication, for the simultaneous transmission of a plurality of wireless communications with waves of substantially the same wave length, comprising employing in the transmitter a plurality of modulated waves and non-modulated compensating waves and utilizing at the receiving station a goniometer device consisting of symmetrically distributed fixed coils, the phases of the compensating waves being so selected that in the goniometer device elliptically polarized rotating fields are produced.

6. A method of radio-communication, for the simultaneous transmission of a plurality of wireless communications with waves of substantially the same wave length, comprising employing in the transmitter a plurality of modulated waves and non-modulated compensating waves and utilizing at the receiving station a goniometer device consisting of symmetrically distributed fixed coils, the phases of the compensating waves being so selected that in the goniometer device an alternating field of fixed direction is produced.

7. A goniometer device for the reception of modulated wireless communication utilizing one carrier wave, comprising at least two detectors at the receiving station, each adapted to pass only one side band and carrier wave, at least two symmetrically distributed fixed coils, each of the said fixed coils being associated with one of the said detectors in such a way that relatively phase-shifted currents in the coils produce in the region enclosed by the coils a polarized rotating magnetic field, and a short-circuited rotor mounted in the said magnetic field, a sound producer, and a vibrating diaphragm in the sound producer.

8. A goniometer device for the reception of modulated wireless communication utilizing one carrier wave, comprising at least two detectors at the receiving station, each adapted to pass only one side band, a subdivided iron core, at least two symmetrically distributed fixed coils, wound upon the said core, each of the said fixed coils being associated with one of the said detectors in such a way that relatively phase-shifted currents in the coils produce in the region enclosed by the coils a polarized rotating magnetic field, a second subdivided iron core, and a rotor having short-circuited turns wound on the said second core and being mounted in the said magnetic field.

In testimony whereof I have signed my name to this specification.

JÓZEF PLEBAŃSKI.